(12) United States Patent
Blair et al.

(10) Patent No.: US 7,112,372 B2
(45) Date of Patent: Sep. 26, 2006

(54) PIGMENTED PANEL ASSEMBLY

(75) Inventors: Dana Blair, Cambridge (GB); Paul Conroy, Cambridge (GB); Paul MacKenzie, Surrey (GB)

(73) Assignee: Hexcel Reinforcements, Villeurbanne (FR)

( * ) Notice: Subject to any disclaimer, the term of this patent is extended or adjusted under 35 U.S.C. 154(b) by 128 days.

(21) Appl. No.: 10/814,413

(22) Filed: Mar. 30, 2004

(65) Prior Publication Data

US 2004/0258879 A1  Dec. 23, 2004

(30) Foreign Application Priority Data

Apr. 2, 2003  (GB) ................................. 0307697.3

(51) Int. Cl.
  *B05D 3/02* (2006.01)
  *B32B 15/08* (2006.01)
  *B32B 27/00* (2006.01)
  *B32B 27/04* (2006.01)
  *B32B 27/08* (2006.01)

(52) U.S. Cl. .................. 428/626; 428/414; 428/297.4; 427/384

(58) Field of Classification Search ................ 428/626, 428/625, 632, 413, 414, 500, 295.1, 297.4, 428/506, 524, 542.2, 542.6; 427/202, 214, 427/372.2, 384, 385.5
See application file for complete search history.

(56) References Cited

U.S. PATENT DOCUMENTS 4,599,212 A   7/1986  Meyer et al.
4,880,681 A  11/1989  Price et al.
5,714,419 A   2/1998  Choate

FOREIGN PATENT DOCUMENTS

| EP | 0967070 A1 | 12/1999 |
| GB | 1 387 692 A | 3/1975 |
| JP | 05-254051 | * 10/1993 |
| JP | 2000071365 | 3/2000 |
| WO | WO 92/17331 | 10/1992 |
| WO | WO 0073055 A1 | 12/2000 |
| WO | WO 03/061964 A1 | 7/2003 |

OTHER PUBLICATIONS

D. Blair and S. Mortimer, *Sampe J. Europe Conference*, Paris, Apr. 1-3, 2003.
H. Gupta and M. Mcabe, *Proceeding of the International Conference for the Promotion of Advanced Fire Resistant Aircraft Materials*, Atlantic City New Jersey USA, 1993, pp. 105, Feb.
U. Soratoria, C. Beck, *Proceedings of Improved Fire and Smoke Resistant Materials for Commercial Aircraft Interiors*, National Research Council. Publication NMAB-477-2, National Academy Press, Washington DC, 1995, pp. 93, no month.
C. A. Wilkie, *Improved Fire and Smoke Resistant Materials for Commercial Aircraft Interiors- A Proceedings*. National Academy Press, 1995 pp. 115, no month.

(Continued)

*Primary Examiner*—Michael E. Lavilla
(74) *Attorney, Agent, or Firm*—W. Mark Bielawski; David J. Oldenkamp

(57) ABSTRACT

Panel assemblies that include a core sandwiched between face sheets made from composite material. A pigmented topcoat layer is applied directly to the composite material without the need for a separate adhesive. The pigmented topcoat layer includes a thermoplastic binder resin/pigment mixture that can be cured with the composite material in a single step. The topcoat may include permanent and/or temporary substrates for carrying the binder resin/pigment mixture and for providing a surface finish to the panel assembly.

23 Claims, 2 Drawing Sheets

OTHER PUBLICATIONS

E. D. Weil, W. Zhu, N. Patel, *Polymer Degradation and Stability*, 54, 1996, pp. 125, no month.

E. D. Weil, *Improved Fire and Smoke Resistant Materials for Commercial Aircraft Interiors-A Proceedings*. National Academy Press, 1995, pp. 12, no month.

EPO Search Report for EPO No. 04251862.1-2124—which is the EPO equivalent of this application, Jun. 2004.

Anonymous: Internet Article, Online! Jun. 1997, XP002284170 Retrieved from Internet by EPO: URL:http://www.dupont.com/tedlar/technicaldata/pdf/n66363.pdf.

* cited by examiner

PIGMENTED PANEL ASSEMBLY

BACKGROUND OF THE INVENTION

1. Field of the Invention

The present invention relates to panel assemblies in which a core material is sandwiched between layers of composite material and wherein a pigmented top coat is located on the outside of the panel to provide color and a surface finish to the panel. More particularly, the invention is directed to panel assemblies in which the pigmented topcoat is bonded to the panel without the use of a separate adhesive layer or the need for multiple curing steps.

2. Description of Related Art

Honeycomb sandwich panels have been used for many years as interior structural components of aircraft, trains and boats. Due to the need for low levels of fire, smoke and toxic emissions in the event of a fire situation, phenolic resin matrices embedded in a reinforcement fiber are typically used as the panel skin material. Examples of this approach are described in U.S. Pat. No. 4,880,681, U.S. Pat. No. 5,714,419 and WO 92/17331.

In order to provide aesthetic appeal to these panels it is customary to apply a top layer of decorative material such as Tedlar® polyvinyl fluoride film to the outer surface of the panel. These decorative sheets may be patterned as in an aircraft cabin or plain colored as in aircraft luggage holds, galleys and other enclosures and compartments. Current methods of applying the top layer to the panel have a limited process temperature interval due to the nature of the adhesive used to bond the decorative material to the panel's outer surface. This can restrict processing to temperatures of 90 to 130° C. depending upon the adhesive used. Since the resin matrix of the panel is typically cured at a temperature from 140° C. to 160° C., two separate curing steps are required. Two steps are also required to avoid the potential loss of Tedlar texture and the phenolic prepreg "staining" the decorative layer during the cure cycle. This is regarded as a disadvantage as it increases processing times and costs.

Attempts have been made to address this problem. For example, U.S. Pat. No. 4,599,212 discloses a reinforced phenolic laminate panel having a finishing coat of a butylated phenol-formaldehyde resin in which the finishing coat can be mass-pigmented to the desired color. However, in this context mass-pigmented means homogeneously pigmented throughout the whole body of the laminate panel.

JP 2000071365 discloses a method of producing a decorative sheet by successively providing a base material layer, an expanded thermoplastic resin layer containing blowing agents and a colored thermoplastic resin layer containing titanium dioxide such that the top layer shields the yellowing of the expanded foam layer caused by the blowing agents. However, JP 2000071365 does not address fiber reinforced thermoset resin layers.

Pigmented gel coats are known in the composites molding industry, but these are pre-applied to the mold surface either by painting or spraying. Furthermore, gel coats are mixtures of resin and curing agents that are of a different formulation from, but capable of being co-cured with, the resin matrix. Scrim-based gel coats are also known, but these also need to be pre-applied to the mold and contain a high level of resin loading. A disadvantage with gel coats is that they have to be cured in the mold as the first stage of the lay-up and curing process.

Attempts have been made to incorporate titanium dioxide directly into a fiber reinforced phenolic resin matrix, but even with loadings as high as 50%, the desired color intensity was not achieved. In addition, structural integrity such as prepreg to core adhesion deteriorated.

SUMMARY OF THE INVENTION

Therefore, it is an object of the present invention to provide a pigmented panel assembly that can be cured at a higher temperature such that a single curing step is sufficient.

According to the first aspect present invention there is provided a pigmented panel assembly comprising a core, at least one prepreg layer and at least one top coat layer, wherein the aforesaid prepreg layer is located between the core and the top coat layer and wherein the top coat layer includes at least one pigment and at least one resin binder wherein the panel assembly can be cured in a single curing process.

According to the second aspect of the present invention there is provided a method for the manufacture of a pigmented panel assembly comprising the steps of applying at least one prepreg layer to a core, applying at least one top coat layer to the aforesaid core and/or the aforesaid prepreg layer such that the said prepreg layer is located between the core and the top coat layer and wherein the said top coat layer includes at least one pigment and at least one resin binder wherein the panel assembly is cured in a single curing process. Advantageously, the pigmented top coat layer and the prepreg layer are such that they can be co-cured in a single curing step, thereby increasing the process efficiency of the manufacture of pigmented panel assemblies.

A further advantage of the present invention is that the pigmented topcoat layer does not contain any matrix resin nor does it penetrate into the lower prepreg layers during curing thus maintaining the desired color intensity.

A still further advantage of the present invention is that during curing the top coat layer chemically bonds with the prepreg layer to which it is applied thereby eliminating the need for additional adhesive materials as is the case with prior art systems.

The above discussed and many other features and attendant advantages of the present invention will become better understood by reference to the detailed description when taken in conjunction with the accompanying drawings.

DETAILED DESCRIPTION OF THE INVENTION

Figure 1:
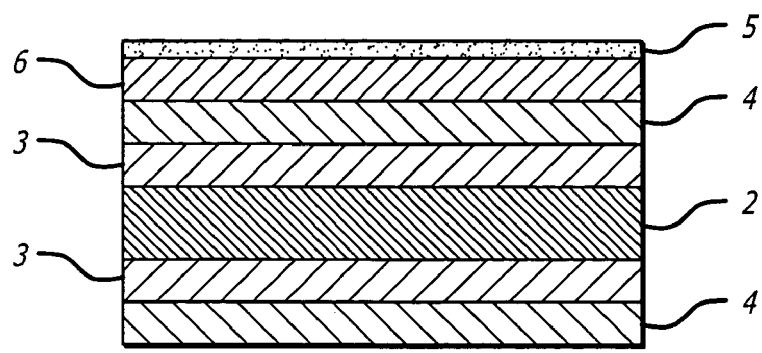
FIG. 1 shows a section through a panel assembly in accordance with the prior art.

The panel assembly of the present invention is preferably cured at a temperature up to 160° C. The core of the present invention may comprise flame retardant foams, honeycomb or even balsa. Preferably, the core includes a non-metallic honeycomb, although metallic honeycombs may also be used.

The core most preferably includes non-metallic honeycombs based on Nomex® or calendered kraft paper such as that described in EP 0967070 A1. Typical honeycombs range from 29 to 89 kgm$^{-3}$ in density and have cell sizes from 3 to 5 mm. The honeycomb may also be over-expanded for use in highly contoured parts. Preferred honeycombs are A1-48-3 and A1-80-3 available from Hexcel Composites Ltd., Duxford, UK.

The panel assembly of the present invention preferably comprises at least two prepreg layers. The prepreg layers may be applied to opposite sides of the core such that each side of the core has at least one prepreg layer applied thereto or the prepreg layers may be applied to the same side of the core such that a second prepreg layer is applied to the surface of a first prepreg layer. The prepreg of the present invention preferably comprises a thermoset resin matrix together with a reinforcement material.

The resin matrix of the present invention is chosen such that it is able to provide the necessary FST properties. Suitable resin matrices which can be used alone or in combination are based on phenolic resole, phenolic novalac or flame retardant or non-flame retardant epoxy systems. Preferably the resin matrices of the present invention, which can be used alone or in combination, include any of: HexPly® HT 93, HexPly® M25, HexPly® M26 and HexPly® M41 available from Hexcel Corporation.

The reinforcement of the present invention may be made from synthetic or natural fibers which may be of a unidirectional or fabric construction, but are preferably of fabric construction. Suitable fabrics, which can be used alone or in combination, include any of the following textile forms: plain, twill and satin weave carbon fabrics. Preferably, the fabric textile form is a satin weave glass fabric having a weight ranging from 105 gm$^{-2}$ (style 120) and 295–303 gm$^{-2}$ (style 7781). In some circumstances, non-woven materials such as random fiber-oriented mats or veils may also be used. These materials can be beneficial for more contoured panels where good drape is required in the molding tool.

The prepreg of the present invention is prepared by techniques well known to those skilled in the art. The preferred method involves solution impregnation of the reinforcement followed by solvent removal in a vertical oven.

The pigment(s) of the topcoat layer is chosen out of consideration for the desired color. Furthermore, any color combination is feasible such that the desired color is afforded. For many applications light colors are desirable and in particular white which is achieved by way of rutile titanium dioxide. There are many suitable grades of titanium dioxide with Kemura TiO$_2$, Tronox RDDI or Tioxide TR81 being particularly suitable as they also give improved resistance to UV degradation. These are available from Kemira Pigments, Helsinki, Finland and Huntsman Tioxide, Calais, France, respectively. The pigment preferably constitutes from 10% to 40% by weight of the topcoat layer and more preferably from 20% to 35% by weight of the topcoat layer.

Preferably the resin binder of the topcoat layer is thermoplastic, its choice being limited solely by its compatibility with the resin matrix of the prepreg layer(s). Furthermore, the resin binder must be capable of forming a film, a property it gives to the topcoat layer. Suitable resin binders, which may be used alone or in combination include any of: polyvinylacetal, polyvinyl fluoride (PVF) or polyvinyl alcohol (PVA). Where the resin matrix of the prepreg is a phenolic resin matrix, polyvinyl butyral has been found to be a particularly suitable resin binder. In this case, the preferred resin binder is Butvar® B90 available from Solutia Inc., St. Louis, Mo.

Additional ingredients may optionally be added to the topcoat layer, these include but are not limited to performance enhancers or modifiers such as in-situ fire barriers (Ceepree® CGB6-220M from Ceepree Products Ltd, Southport, UK or flame retardants such as Exolit® AP 400 series from Clariant AG, Basel, Switzerland, smoke suppressants (Firebrake® Z B from Omya UK Ltd., Dorking, England, or Magnifin® from Martinswerk GmbH, Cologne, Germany), viscosity control agents i.e., thioxotropes (Cabosil® from Cabot Corp., Tuscola, Ill.) and chopped E Glass fibers from Vetrotex UK Ltd., Wallingford, England. The chopped fiber contributes to minimizing print-through in the cured panel of the honeycomb pattern.

A preferred exemplary topcoat composition will typically have the following ranges of ingredients:

| Material | % by weight included |
| --- | --- |
| Polyvinyl Butyral | 40–70 |
| Titanium Dioxide | 15–40 |
| Fumed Silica | 0.1–2 |
| Fire Barrier and/or Flame Retardant | 5–20 |

Smoke suppressants may also be incorporated as an additional 0.5–10% by weight over the above ingredients.

The pigmented topcoat layer may be prepared as a paste by dissolving the resin binder in a suitable solvent, for example industrial methylated spirit (IMS) and MEK and adding to this the required amount of pigment. Alternatively a water emulsion of resin binder can be prepared and the pigment dispersed therein as desired.

Preferably the topcoat layer is applied to the prepreg layer(s) before lay-up via a suitable substrate. The paste material described above is applied to the substrate using standard coating techniques such as blade coating, reverse roll coating, forward roll coating, solution dipping and film extrusion. Alternatively, the paste may be applied to the substrate such that the paste impregnates the substrate. The coated or impregnated substrate is then passed through an oven to remove the solvent and wound onto a roll. If desired, an interleaf material such as release paper or polyethylene film can also be incorporated. The substrate may be a textile, a random fiber mat, or a thermoplastic film or a release paper. The substrate can remain as part of the finished panel assembly or it can be removed after curing. Typically, the textile substrates remain as part of the final product whereas the thermoplastic film is removed after completion of the curing process.

Where the substrate is a thermoplastic film it is preferable that it has a melting point that is greater than the cure temperature of the prepreg. The melting point of the thermoplastic film is preferably greater than 160° C. and more preferably greater than 200° C. Suitable thermoplastic film substrates include polyethylene terephthalate (PET), particularly suitable grades including PET-W-50-S20, PET-N-36-S30, PET-N-50-S40 and PET-N-36-S10 ideally having a thickness between 36 and 50 μm. These films are available from API Coated Products Ltd., Cheltenham, UK. The use of a PET film improves the quality of the surface finish due to the superior quality of surface of the PET film over the steel surface of the press platens. Unlike the textile substrates, the PET film is left in place on the exterior of the topcoat layer only during the curing process. The PET film is removed once cure is complete to expose the underlying surface finish. The removable thermoplastic film may be used alone as a substrate or it may be used in combination with permanent textile substrates, such as glass fabric.

The selection of the appropriate textile substrate is dependent upon the finished panel assembly construction requirements. In some instances the textile only needs to support the topcoat layer i.e., the resin binder and the pigment, and can therefore be of lighter weight, whereas other instances may require some structural contribution from the textile, in which case heavier weights will be required.

Suitable textile substrates preferably have areal weight below 150 $gm^{-2}$. For example, plain weave glass fabric having an areal weight of 20 $gm^{-2}$ (style 104), 4-harness stain weave glass having an areal weight of 105 $gm^{-2}$ (style 120), both of which are available from Hexcel Reinforcements, Villeurbanne, France. Further examples of suitable textile substrates include, but are not limited to warp knitted nylon 6 carrier at 10 $gm^{-2}$ (style A1050), plain weave nylon 6.6 carrier at 22 $gm^{-2}$ (style K4590), reed and pick cotton scrim cloth at 13 to 23 $gm^{-2}$ and polyester or glass mats such as 6 $gm^{-2}$ (T2178/09 polyester mat from Technical Fibre Products, Kendal, UK).

The finished topcoat layer i.e. the substrate, the resin binder and the pigment preferably have a weight range from 20 to 170 $gm^{-2}$ and more preferably from 40 to 150 $gm^{-2}$.

Where the pigmented topcoat material is coated or impregnated onto a substrate, the topcoat layer is applied by lamination of the substrate onto the prepreg layers as the last stage of the production process. Alternatively, the topcoat material may be applied to the core and prepreg assembly during the final stage of lay-up prior to curing. Where the pigmented topcoat is not coated or impregnated onto a substrate, the paste material may be sprayed directly onto the prepregs layer(s).

The present invention will now be described further by way of example only and with reference to the drawings as follows:

A typical prior art panel assembly is shown in FIG. 1. The panel assembly 1 comprises a Nomex® A1-48-3 core 2 having a single layer of an M41 phenolic matrix and 7781 glass reinforced prepreg 3 applied to both of its outer surfaces and a second layer 4 of the said prepreg applied to the first layer thereby providing a 2 ply prepreg system. The core 1 and the prepreg 3 and 4 may be cured either by a crush core process of hot loading and curing at 140° C. for 7 minutes under sufficient pressure to crush the panel assembly to the required thickness (typically 60 to 70 Bar pressure to the press platens) or an open press process of cold loading and curing at 135° C. for 30 minutes at 0.9 to 4.0 Bar pressure. A decorative topcoat layer 5 is then applied to the outer surface of the second prepreg layer by way of an adhesive 6. The adhesive 6 is then cured in a second bonding step at 90° C. and 3 Bar pressure.

Figure 2:
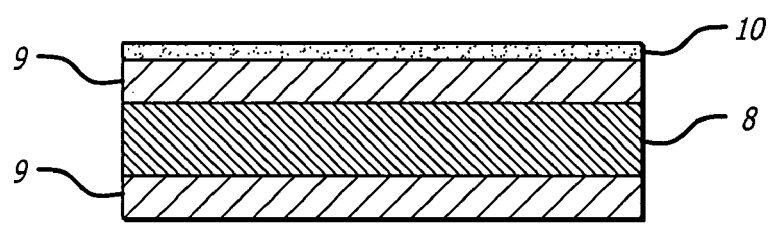
FIG. 2 shows a section through one embodiment of the present invention.

FIG. 2 shows a section through one embodiment of a panel assembly 7 according to the present invention having a honeycomb Nomex® A1-48-3, wherein both of its outer surfaces has a single layer of an M41 phenolic matrix and 120 glass reinforced prepreg 9. A topcoat layer 10 comprising titanium dioxide pigmented Butvar® on a 120 glass substrate is applied to the outer surface of the 120 glass reinforced prepreg 9. The panel assembly 7 is then cured by way of a crush core process, wherein the panel assembly is hot loaded and cured at 140° C. for 7 minutes under sufficient pressure to crush the panel assembly to the required thickness (typically 60 to 70 Bar pressure to the press platens). The 120 glass substrate is left in place and becomes a permanent part of the topcoat layer 10.

Figure 3:
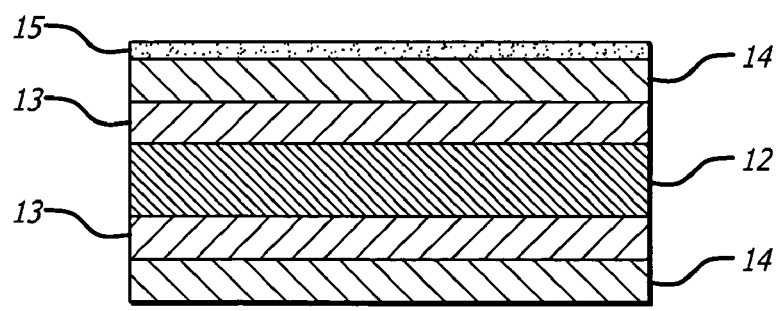
FIG. 3 shows a section through a second embodiment of the present invention.

FIG. 3 shows a section through a second embodiment of a panel assembly 11 according to the present invention having a honeycomb Nomex® A1-48-3 core 12 wherein two layers of an M41 phenolic matrix and 7781 glass reinforced prepreg 13 and 14 are applied to each outer surface of the core. A topcoat layer 15 made up of titanium dioxide pigmented Butvar® on a PET film substrate is applied to one of the outer surfaces of the prepreg. The panel assembly 11 is then cured by way of a crush core process, wherein the panel assembly 11 is hot loaded and cured at 140° C. for 7 minutes under sufficient pressure to crush the panel assembly 11 to the required thickness (typically 60 to 70 Bar pressure to the press platens). The PET film substrate is removed after the panel assembly is cured.

Figure 4:
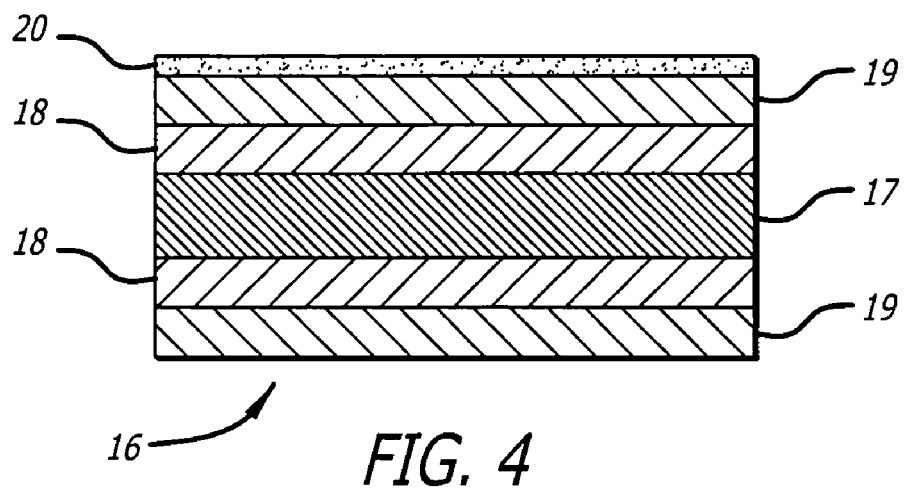
FIG. 4 shows a section through a third embodiment of the present invention.

FIG. 4 shows a section through a third embodiment of a panel assembly 16 according to the present invention having a honeycomb Nomex® A1-48-3 core 17, wherein two layers of an M41 phenolic matrix and 7781 glass reinforced prepreg 18 and 19 are applied to each of the cores outer surfaces. A topcoat layer 20 comprising titanium dioxide pigmented Butvar® on a polyester matt substrate is applied to one of the outer surfaces of the 2-layer prepreg. The panel assembly 16 is then cured by way of a platen press. The panel assembly 16 is cold loaded and cured at 135° C. for 30 minutes at 0.9 to 4.0 Bar pressure. The polyester matt substrate is left in place and becomes a permanent part of the topcoat layer 20.

Figure 5:
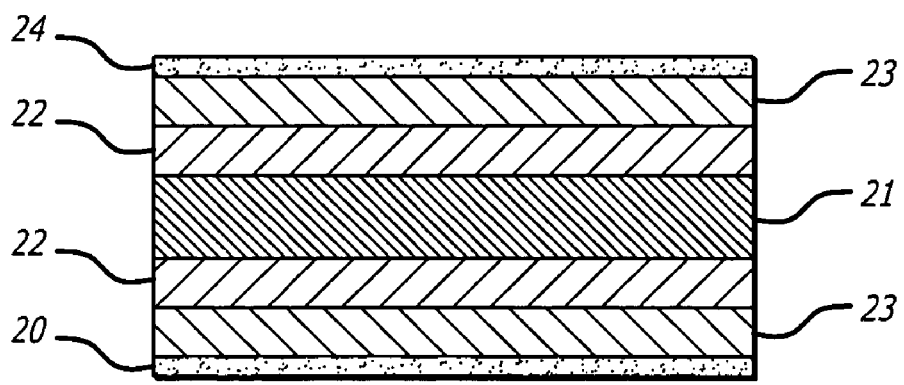
FIG. 5 shows a section through a fourth embodiment of the present invention.

FIG. 5 shows a section through a fourth embodiment of a panel assembly 20 according to the present invention having a honeycomb Nomex® A1-48-3 core 21, wherein two layers of an HT93 phenolic matrix and 7781 glass substrate prepreg 22 and 23 are applied to each of the cores outer surfaces. A topcoat layer 24 made up of titanium dioxide pigmented Butvar® on a PET film substrate is applied to each outer surface of both the prepreg layers. The panel assembly 20 is then cured by way of a platen press, wherein the panel assembly 20 is cold loaded and cured at 135° C. for 90 minutes at 3 Bar pressure. The PET film is removed after the panel assembly is cured.

The following example further illustrates the present invention:

EXAMPLE 1

An example of a pigmented topcoat layer composition is as follows:

| Material | % by weight included |
| --- | --- |
| Butvar B90[1] | 63 |
| TiO$_2$ RDD1[2] | 30 |
| Cabosil TS720[3] | 2 |
| Ceepree CGB6-220M[4] | 5 |

[1]Butvar B90—Polyvinyl Butyral
[2]TiO$_2$ RDD1—Alumina-Silica surface treated rutile titanium dioxide
[3]Cabosil TS720—Fumed Silica
[4]Ceepree CGB6-220M—Fire barrier material The above materials are dispersed into an 4:1 IMS:MEK solvent blend with a solids range of 20 to 30% according to the following process:

1. Mixing vessel is charged with IMS and MEK
2. Polyvinyl Butyral is added with stirring, the mixture is stirred until polyvinyl butyral has completely dissolved.

3. TiO$_2$ pigment is added with high speed sheer, mixed until dispersed and the particle size is below 5 µm. Particle size reduction can also be achieved via triple roll milling if necessary. A Hegman gauge or similar instrument is used to determine the particle size.
4. The fire barrier is added with high-speed shear.
5. The fumed silica is added with high speed mixing, and the mixture is mixed until the fumed silica is dispersed. Additional ingredients such as smoke suppressants, or chopped glass fibers may be added at this stage, if desired.
6. The mixer should be a high-speed dispersion mixer of appropriate size and power for the size of the batch being made.

The resulting pigmented resin mixture is then applied to a textile and/or thermoplastic film/release paper substrate to form an uncured pigmented layer that can be applied directly to the prepreg face sheet without the need for an adhesive.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the above preferred embodiments and examples, but is only limited by the following claims.

What is claimed is:

1. An uncured panel assembly comprising a:
a core having a first and a second surface, said first and second surfaces being located on opposite sides of said core and defining the thickness of said core;
at least one uncured prepreg located on at least one of said first or second surfaces of said core, said uncured prepreg having an outer surface and an inner surface, said inner surface being located adjacent to said core first or second surface and said uncured prepreg comprising a thermosetting resin that has a cure temperature; and
an uncured pigmented layer attached directly to the outer surface of said uncured prepreg, said uncured pigmented layer comprising:
an uncured pigmented binder resin, said uncured pigmented binder resin comprising an uncured thermoplastic resin and a pigment wherein said thermoplastic resin has a cure temperature that is equal to or less than the cure temperature of said uncured thermosetting resin present in said prepreg.

2. An uncured panel assembly according to claim 1 wherein said core comprises honeycomb.

3. An uncured panel assembly according to claim 1 wherein said uncured thermoplastic resin present in said uncured pigmented binder is polyvinyl butyral.

4. An uncured panel assembly according to claim 1 wherein said uncured thermosetting resin present in said uncured prepreg is selected from the group consisting of phenolic resole, phenolic novalac and flame retardant epoxy.

5. An uncured panel assembly according to claim 1 which further comprises a substrate on which said pigmented binder resin is located, said substrate having a prepreg melting point that is above the cure temperature of said.

6. An uncured panel assembly according to claim 5 wherein said substrate comprises a textile substrate and/or a film substrate.

7. An uncured panel assembly according to claim 6 wherein said film substrate comprises polyethylene.

8. An uncured panel assembly according to claim 6 wherein said textile substrate comprises a textile selected from the group consisting of glass fabric and polyester matt.

9. An uncured panel assembly according to claim 1 wherein said pigment comprises titanium dioxide.

10. An uncured panel assembly according to claim 9 wherein said uncured thermoplastic resin present in said uncured pigmented binder comprises polyvinyl butyral, said uncured thermosetting resin present in said prepreg is selected from the group consisting of phenolic resole, phenolic novalac and flame retardant epoxy and said substrate comprises a thermoplastic film substrate comprising polyethylene terephthalate.

11. A panel assembly comprising an uncured panel assembly according to claim 1 that has been heated to a processing temperature that is equal to or above the cure temperature for said thermosetting resin for a sufficient time to cure both said thermosetting resin in said prepreg and said thermoplastic resin present in said pigmented binder.

12. A method for making an uncured pigmented panel assembly, said method comprising the steps of:
providing a core having a first and a second surface, said first and second surfaces being located on opposite sides of said core and defining the thickness of said core;
locating at least one uncured prepreg on at least one of said first or second surfaces of said core, said uncured prepreg having an outer surface and an inner surface, said inner surface being located adjacent to said core first or second surface and said uncured prepreg comprising a thermosetting resin that has a cure temperature; and
applying an uncured pigmented layer directly to the outer surface of said uncured prepreg, said uncured pigmented layer comprising an uncured pigmented binder resin, said uncured pigmented binder resin comprising an uncured thermoplastic resin and a pigment wherein said thermoplastic resin has a cure temperature that is equal to or less than the cure temperature of said uncured thermosetting resin present in said prepreg.

13. A method for making an uncured pigmented panel assembly according to claim 12 wherein said uncured pigmented layer comprises a substrate on which said pigmented binder resin is located, said substrate having a melting point that is above the cure temperature of said prepreg.

14. A method for making an uncured pigmented panel assembly according to claim 12 wherein said core comprises honeycomb.

15. A method for making an uncured pigmented panel assembly according to claim 12 wherein said uncured thermoplastic resin present in said uncured pigmented binder is polyvinyl butyral.

16. A method for making an uncured pigmented panel assembly according to claim 12 wherein said uncured thermosetting resin present in said uncured prepreg is selected from the group consisting of phenolic resole, phenolic novalac and flame retardant epoxy.

17. A method for making an uncured panel assembly according to claim 13 in which said substrate comprises a textile substrate and/or a thermoplastic film substrate.

18. A method for making an uncured panel assembly according to claim 17 wherein said substrate comprises a thermoplastic film substrate comprising polyethylene terephthalate.

19. A method for making an uncured panel assembly according to claim 18 wherein said film comprising polyethylene terephthalate is between about 36 and 50 microns thick.

20. A method for making an uncured panel assembly according to claim 12 wherein said pigment comprises titanium dioxide.

21. A method for making an uncured panel assembly according to claim 17 wherein said pigment comprises titanium dioxide, said uncured thermoplastic resin present in said uncured pigmented binder comprises polyvinyl butyral, said uncured thermosetting resin present in said prepreg is selected from the group consisting of phenolic resole, phenolic novalac and flame retardant epoxy and said substrate comprises a thermoplastic film substrate comprising polyethylene terephthalate.

22. A method according to claim 12 that includes the additional steps of heating said uncured panel assembly to a processing temperature that is equal to or above the cure temperature for said thermosetting resin for a sufficient time to cure both said thermosetting resin in said prepreg and said thermoplastic resin present in said pigmented binder to form a cured panel assembly.

23. A method according to claim 13 that includes the additional step of heating said uncured panel assembly to a processing temperature that is equal to or above the cure temperature for said thermosetting resin for a sufficient time to cure both said thermosetting resin in said prepreg and said thermoplastic resin present in said pigmented binder to form a cured panel assembly, wherein said processing temperature is below the melting point of said substrate.

* * * * *